(12) United States Patent
Haile

(10) Patent No.: US 6,777,465 B2
(45) Date of Patent: Aug. 17, 2004

US006777465B2

(54) TACKIFIER COMPOSITION

(76) Inventor: Michael L. Haile, P.O. Box 106, Davis, CA (US) 95617

( * ) Notice: Subject to any disclaimer, the term of this patent is extended or adjusted under 35 U.S.C. 154(b) by 0 days.

(21) Appl. No.: 09/879,509

(22) Filed: Jun. 11, 2001

(65) Prior Publication Data

US 2002/0188042 A1 Dec. 12, 2002

(51) Int. Cl.⁷ .............................. C08L 3/00; C08L 89/00
(52) U.S. Cl. .............................. 524/47; 524/48; 524/49; 524/9; 524/22
(58) Field of Search .............................. 524/47, 48, 49, 524/10, 55–58, 9, 22

(56) References Cited

U.S. PATENT DOCUMENTS

| 3,600,852 A | 8/1971 | Burke |
| 3,763,072 A | 10/1973 | Krieger |
| 3,875,697 A | 4/1975 | Bracke |
| 3,938,279 A | 2/1976 | Fonne |
| 4,369,597 A | 1/1983 | Leep et al. |
| 4,705,816 A | 11/1987 | Pole et al. |
| 4,751,259 A | * 6/1988 | Roe et al. ................. 524/52 |
| 4,865,640 A | 9/1989 | Avera |
| 5,082,500 A | 1/1992 | Nachtman et al. |
| 5,459,181 A | 10/1995 | West et al. |
| 5,516,830 A | 5/1996 | Nachtman et al. |
| 5,556,033 A | 9/1996 | Nachtman |
| 5,801,116 A | 9/1998 | Cottrell et al. |
| 5,849,364 A | 12/1998 | Nachtman et al. |
| 6,029,395 A | 2/2000 | Morgan |
| 6,071,325 A | * 6/2000 | Schmitt ................. 75/321 |
| 6,076,299 A | 6/2000 | Spittle et al. |
| 6,096,373 A | 8/2000 | Nachtman et al. |

* cited by examiner

Primary Examiner—James J. Seidleck
Assistant Examiner—U. K. Rajguru
(74) Attorney, Agent, or Firm—Theodore J. Bielen, Jr.

(57) ABSTRACT

A tackifier utilizing a synthetic polymer of polyacrylamide, polyacrylate, or a co-polymer of acrylamide or acrylate, combined with a natural organic material. A cross-linking agent is also employed to cross-link the synthetic polymer to the natural organic material.

7 Claims, No Drawings

TACKIFIER COMPOSITION

BACKGROUND OF THE INVENTION

The present invention relates to a novel and useful tackifier.

Binders or tackifiers are employed to bind together many kinds of materials, especially particulate matter. For example, tackifiers may be employed as dust palliatives, landfill stabilizers, alternate daily cover, binders for manufacturing and mining waste products, a component for hydraulic planting, straw tacking, erosion controllers, soil stabilizers, components in fire retardant and insulative materials, and the like. Hydro-mulching or hydro-seeding, straw tacking, alternate daily cover, as well as insulation applications, often require the mixing of fiber with a tackifier. Of course, hydro-seeding also includes the addition of particular seeds which are intended to grow from the soil being spread with the tackifier, fiber, fertilizer and seed combination. Tackifiers may be used alone for the above purposes.

Many methods and products have been proposed for combining with soils or other particulates. For example, U.S. Pat. No. 4,865,640 describes a moisturizing substrate utilizing cellulosic compounds combined with hydrated metallic salts and aerated water through an ether linkage.

U.S. Pat. Nos. 5,556,033, 5,849,364, and 6,096,373 describe sprayable compounds which are formed into a slurry and used to cover items forming a water repellant layer.

U.S. Pat. No. 4,369,597 describes a process for making pelletized mint mulch derived from the mint plant. The mint pellets may be spread or sprayed by hydro-mulching machines, and may also contain a natural tackifier to adhere fibers to the soil surface.

U.S. Pat. No. 3,763,072 shows an erosion control crust formed of acrylic latex emulsion and sodium silicate.

U.S. Pat. Nos. 5,082,500 and 5,516,830 illustrate a sprayable composition of a polymer mixed with clay and water to provide a flexible water repellent layer over soil, refuse, or grain.

U.S. Pat. No. 6,029,395 teaches a biodegradable mulch mat utilizing hair fibers, granulated corn, and a vinyl polymer as a binder. The mulch mat is used to improve soil temperature, suppress weeds, and build soil, while conserving soil and water.

U.S. Pat. No. 4,705,816 describes a liquid mulch prepared from a polymeric binder and fine particulate filler particles.

U.S. Pat. No. 6,076,299 delineates mulching pellets made from finely divided paper and wood, a water absorbent natural polymer, and a surfactant. Natural polymer may be a guar gum.

U.S. Pat. No. 3,938,279 puts forth a growth medium which is used to cover a soil surface consisting of a mixture of cement, fiber, and fertilizer.

U.S. Pat. No. 3,600,852 shows a seed containing composition utilizing gypsum and enough water to produce a slurry.

U.S. Pat. No. 5,459,181 teaches a hydraulic binder composition having a suitable hydroxyl bearing polymer, a covalent cross-linking agent, and a catalyst. The final formulation is an insoluble structure and serves as a binder or tackifier.

U.S. Pat. No. 5,801,116 describes a process for producing polysaccharides in a coarse particle size. The composition is used to absorb materials.

U.S. Pat. No. 3,875,697 shows the cross-linking of acrylamide polymers with hypochlorite and hypobromite salts of alkali and alkaline-earth metals.

A binder and tackifier which is easily prepared and delivered to a site through spraying techniques known in the art would be a notable advance in the field of particulate control.

BRIEF SUMMARY OF THE INVENTION

In accordance with the present invention a novel and useful tackifier is herein described.

The tackifier of the present invention utilizes a synthetic polymer consisting essentially of polyacrylamide or polyacrylate, or a co-polymer of acrylate and acrylamide. Such polymers are commonly referred to as PAM. It is known that PAM may be used as a tackifier in 100% concentrations combined with water. However, PAM is quite expensive to employ in this regard. Also, it is known to spray solutions of natural organic materials alone, such as cornstarch for use as a binder or tackifier. However, such natural materials are highly susceptible to bacterial degeneration and are not suitable for long-term use. In addition, natural organic materials require application in high volumes, typically 60–120 pounds per acre.

Combined with the synthetic PAM polymer of the present invention is a natural organic material. Such natural organic materials may take the form of cornstarch, rice starch, wheat starch, potato starch, polysaccharides, modified polysaccharides, mint, animal gelatin, plant seed husks, corn gluten, natural latex, guar gum, psyllium, mucilage, or kelp. Although the simple mixture of PAM and a natural organic material produces an association, theorized as a molecular entanglement, a cross-linking agent is also employed in the present invention to cross-link the PAM polymer to the natural organic material. For example, the cross-linking agent may take the form of sodium borate, sodium metaborate, sodium tetraborate, hydrated sodium borate, hydrated sodium metaborate, hydrated sodium tetraborate (borax), magnesium sulfate, molybdenum sulfate, or sodium molybdate.

The PAM, natural organic material, and cross-linking agent may be mixed together with a sufficient amount of water to form a sprayable slurry. Fiber, such as paper or wood fiber, may be added to the slurry to form an insulative or erosion control material. Fertilizer may also be added to the slurry to enhance seedling development. In addition, seed may be added to the fiber to form a fiber slurry which may be used for hydro-seeding purposes.

In certain cases, the tackifier combination of the present invention may include a surfactant to improve permeability and wetting of the tackifier of the present invention. Moreover, a colorant may be added as an indicator to show the extent of spreading of the tackifier of the present invention over a surface. In addition, admixtures may be formed with the tackifier of the present invention and water absorbent polymers to increase water-holding capacity of the same.

It may be apparent that a novel and useful tackifier has been described.

It is therefore an object of the present invention to provide a tackifier which may be used to control soil erosion, dust, and migration of particulate matter of various types.

Another object of the present invention is to provide a tackifier utilizing the relatively expensive synthetic organic component and a relatively inexpensive natural organic material to form an effective low cost tackifier which may be used for various purposes.

Another object of the present invention is to provide a tackifier using multiple synthetic and natural components which may be cross-linked into a macromolecule to add stability to the tackifier.

Another object of the present invention is to provide a tackifier which may be employed to control the migration of particulate matter, to aid in hydro-seeding, and form other layers which exhibit insulation and fire retardancy characteristics.

Another object of the present invention is to provide a tackifier including components that possess low toxicity, permitting safe handling, and are compatible with sources of water, including surface, ground, and potable water sources.

A further object of the present invention is to provide a tackifier for various uses which is inexpensive to manufacture and is easily spread by conventional methods.

Another object of the present invention is to provide a tackifier for various uses which sets up in a relatively short time period, is relatively durable, and re-solubilizes after an initial drying.

A further object of the present invention is to provide a tackifier which may be employed in hydro-seeding, hydro mulching, or hydraulic planting processes.

The invention possesses other objects and advantages especially as concerns particular characteristics and features thereof which will become apparent as the specification continues.

DETAILED DESCRIPTION OF THE PREFERRED EMBODIMENTS OF THE INVENTION

Various aspects of the present invention will evolve from the following detailed description of the preferred embodiments thereof which should be taken in conjunction with the appended examples.

The tackifier of the present invention utilizes a synthetic polymer known as polyacrylamide, polyacrylate, or a co-polymer of acrylamide and acrylate (PAM). PAM is produced in various molecular weights and is generally a synthetic material. The PAM component in the present invention varies between 10 and 80 percent by weight in an operating range. In certain instances the polymer may be present in a preferred range of 10 to 60 percent by weight. Finally, an optimum range for the synthetic polymer would lie between 50 to 65 percent by weight. The preferred form of PAM contains 0.05% acrylamide monomer or less to minimize toxicity.

Another component of the tackifier of the present invention would take the form of a natural organic material. Such natural organic materials may be considered to be waste materials and are relatively cheap to obtain. However, it has been found in the present invention that such natural organic materials in the presence of PAM forms a relatively durable tackifier either by co-polymerization and/or molecular entanglement. Such natural organic materials may include cornstarch, rice starch, wheat starch, potato starch, polysaccharides, modified polysaccharides, animal gelatin, plant seed husks, mint, corn gluten, natural latex, guar gum, psyllium, mucilage, and kelp. In operative combination with PAM, the natural organic material may range between 15 and 75 percent by weight. Likewise, the preferred range of the natural organic material lies between 15 and 45 percent by weight. Also, the optimal range for the natural organic material exists between 25 and 35 percent by weight.

A cross-linking agent is also employed in the present invention. The cross-linking agent takes the form of an inorganic salt. It has been found that sodium borate, sodium metaborate, sodium tetraborate, hydrated sodium borate, hydrated sodium metaborate, hydrated sodium tetraborate (Borax), magnesium sulfate, molybdenum sulfate, and sodium molybdate, are sufficient in this regard. Other inorganic salts would also serve as cross-linking agents between the PAM and the natural organic material. The operative range of the cross-linking agent is 1 to 15 percent by weight. A preferred range of the cross-linking agent lies between 1 and 10 percent by weight. Also, the optimum range of the cross-linking agent ranges between 8 and 12 percent by weight.

In certain instances, a surfactant may be employed to aid in the tackifier's penetration and wetting characteristics. Such surfactant may be employed in an amount ranging between a trace amount and to about 1 percent by weight.

To permit the tackifier of the present invention to be sprayed or delivered through a nozzle, a sufficient amount of water may be added to the tackifier formulations delineated above. The latter addition produces a sprayable composition.

It should also be noted that the tackifier above described may be mixed with fiber of various kinds to produce insulative coatings, fire retardant coatings, and the like. In addition, seeds may be added, with or without the fibers, to produce a mixture which is suitable for hydro-seeding purposes.

Also, a small quantity of inert coloring material, less than 1 percent by weight, may be added to the add mixture during production and packaging.

It has been found that the tackifier of the present invention uses ⅓ less PAM than a tackifier employing pure PAM. This results in the tackifier of the present invention being useable as an effective, low cost, product. Moreover, the tackifier of the present invention may be employed in lesser amounts than natural organic materials. For example, 60–120 pounds per acre of natural organic material is required, versus about 3 pounds per acre of the tackifier of the present invention.

The following examples are submitted to illustrate the invention in further detail, but are not deemed to limit the invention in any manner.

EXAMPLE I

The tackifier of the present invention was produced such that a dry entity was formed having 60 percent by weight PAM, 30 percent by weight modified cornstarch and 10 percent by weight sodium tetraborate decahydrate (borax). The PAM component may be identified as a linear, anionic, co-polymer of acrylamide and sodium acrylate, containing less than 0.05% acrylamide monomer.

It was intended that the tackifier be used as a hydro-seeding operation at a rate of application of 3 pounds per acre. In addition, pure PAM was employed as a control.

The tackifier of the present invention was weighted using a triple beam gram scale and prepackaged in zip-lock plastic bags. It is estimated that the weight of the tackifier was accurate within one half gram per tank load. In this regard, 600 gallons of water was supplied from a municipal water source into a sufficiently large empty tank. Mechanical agitation was also applied to the tank. Two thirds of a pound of the dry tackifier was added slowly into the tank. Seed in the form of a dwarf type tall fescue packaged by Horizon of Sacramento, Calif. was also employed. Paper fiber manufactured by the Hamilton Paper Company of Boise, Id. was also used in sufficient quantities. Fertilizer was then added to promote growth of germinated seeds. The fertilizer was manufactured by Simplot of Lathrop, Calif. Additional water was then added to top off the tank, bringing the total volume of the water, tackifier, fiber, and fertilizer to about 900 gallons. Agitation took place for about 20 minutes while the slurry was transported to the test site. Slurry was then pumped through a 1.5 inch hose with a 50 degree nozzle and sprayed by hand over the surface of soil which was prepared and leveled prior to the hydro-seeding. Such preparation and leveling was accomplished according to standard landscape methods for the establishment of residential turf grass. Adequate irrigation was also installed to germinate the seed.

Another area was prepared, leveled, and irrigated and sprayed with pure PAM. Both areas each covered roughly 9,500 to 10,000 square feet.

Resulting coverage of the tackifier of the present invention was judged to be adequate by the applicator. Upon drying, the tackifier of the present invention adequately bound the fiber and soil particles together. The dried layer ranged between 1/16 of an inch to 3/4 of an inch in depth. The same occurred with the controlled spraying with pure PAM. The applicator was also of the opinion that the pattern and "bounce" (adherence) of the slurry formed from the tackifier of the present invention and the control fiber slurry were essentially the same. No problems were encountered during the mixing or application stages. Both the slurry employing the tackifier of the present invention and the control slurry using pure PAM dried within four hours.

After 14 days, both sites were observed and germination was determined to be normal.

EXAMPLE II

The tackifier of the present invention was prepared as a slurry as described in Example I. Samples were placed on paper plates to evaluate rewetting characteristics. After drying of the slurry, water was added to the tackifier of the present invention. It was determined that rewetting was adequate.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A tackifier for binding particulate matter into a covering on a soil surface, consisting essentially of:

a. a synthetic polymer selected from the group consisting of polyacrylamide, polyacrylate, and a co-polymer of acrylate and acrylamide;

b. a natural organic material associated with said synthetic polymer; and c. a cross-linking agent for cross-linking said synthetic polymer and said associated natural organic material, said cross-linking agent being compatible with live entities, said cross-linking agent selected from the group consisting of: sodium borate, sodium metaborate, sodium tetraborate, hydrated sodium borate, hydrated sodium metaborate, hydrated sodium tetraborate, magnesium sulfate, molybdenum sulfate, and sodium molybdate, and an effective amount of water to produce a pumpable composition of said synthetic polymer, said associated natural organic material and said cross-linking agent.

2. The tackifier of claim 1 in which said synthetic polymer is present in an amount from 10% to 80% by weight, said natural organic material associated with said synthetic polymer is present in an amount from 15% to 75% by weight, and said cross-linking agent is present in an amount from 1% to 15% by weight.

3. The tackifier of claim 1 in which said synthetic polymer is present in an amount from 10% to 60% by weight, said natural organic material associated with said synthetic polymer is present in an amount from 15% to 45% by weight, and said cross-linking agent is present in an amount from 1% to 10% by weight.

4. The tackifier of claim 1 in which said synthetic polymer is present in an amount from 50% to 65% by weight, said natural organic material associated with said synthetic polymer is present in an amount from 25% to 35% by weight, and said cross-linking agent is present in an amount from 8% to 12%, by weight.

5. The tackifier of claim 1 in which said natural organic material is selected from the group consisting essentially of: cornstarch, rice starch, wheat starch, potato starch, polysaccharides, mint, animal gelatin, plant seed husks, corn gluten, natural latex, guar gum, psyllium, mucilage, and kelp.

6. The tackifier of claim 1 which additionally consists essentially of a surfactant present in an amount ranging between a trace amount and about 1% by weight.

7. The tackifier of claim 1 which additionally includes of a fiber to form a slurry.

* * * * *